US 7,536,557 B2

(12) United States Patent
Murakami et al.

(10) Patent No.: US 7,536,557 B2
(45) Date of Patent: May 19, 2009

(54) METHOD FOR BIOMETRIC AUTHENTICATION THROUGH LAYERING BIOMETRIC TRAITS

(75) Inventors: Rick V. Murakami, North Ogden, UT (US); Clark T. Hinton, Glendale, AZ (US); Matthew W. Pettit, Mountain Green, UT (US)

(73) Assignee: Ensign Holdings, Salt Lake City, UT (US)

( * ) Notice: Subject to any disclaimer, the term of this patent is extended or adjusted under 35 U.S.C. 154(b) by 0 days.

(21) Appl. No.: 09/814,607

(22) Filed: Mar. 22, 2001

(65) Prior Publication Data

US 2002/0138768 A1 Sep. 26, 2002

(51) Int. Cl.
*H04L 9/00* (2006.01)
*G06F 7/04* (2006.01)
*G06K 9/00* (2006.01)

(52) U.S. Cl. .............................. 713/186; 726/5; 726/18; 726/19; 382/115; 382/116; 382/117; 382/118

(58) Field of Classification Search ....................... None
See application file for complete search history.

(56) References Cited

U.S. PATENT DOCUMENTS

| | | | |
|---|---|---|---|
| 4,109,237 A | | 8/1978 | Hill |
| 4,163,447 A | * | 8/1979 | Orr ............................. 128/666 |
| 4,239,048 A | * | 12/1980 | Steuer ......................... 128/666 |
| 4,537,484 A | | 8/1985 | Fowler et al. .................. 354/62 |
| 4,544,267 A | * | 10/1985 | Schiller ....................... 356/71 |
| 4,582,985 A | | 4/1986 | Lofberg |
| 4,614,861 A | | 9/1986 | Pavlov et al. |
| 4,699,149 A | | 10/1987 | Rice ............................ 128/664 |
| 4,728,186 A | | 3/1988 | Eguchi et al. ................. 356/71 |
| 4,784,484 A | | 11/1988 | Jensen ......................... 356/71 |
| 4,846,190 A | | 7/1989 | John |
| 4,896,363 A | * | 1/1990 | Taylor et al. ................... 382/5 |
| 4,993,068 A | * | 2/1991 | Piosenka et al. .............. 380/23 |
| 5,034,615 A | * | 7/1991 | Rios et al. ................. 250/461.1 |
| 5,073,950 A | | 12/1991 | Colbert et al. ................. 382/2 |
| 5,077,803 A | | 12/1991 | Kato et al. .................... 382/4 |

(Continued)

FOREIGN PATENT DOCUMENTS

EP 0197810 * 3/1985

(Continued)

OTHER PUBLICATIONS

Merriam-Webster's Collegiate Dictionary, Tenth Edition, 2001, Merriam-Webster Incorporated, p. 905.*

(Continued)

*Primary Examiner*—Ayaz R Sheikh
*Assistant Examiner*—Aravind K Moorthy
(74) *Attorney, Agent, or Firm*—John R. Thompson; Stoel Rives LLP

(57) ABSTRACT

A portable biometric authentication system having a single technology for measuring multiple, varied biological traits to provide individual authentication based on a combination of biological traits. At least one of these biometric traits is a live physiological trait, such as a heartbeat waveform, that is substantially-but not necessarily completely-unique to the population of individuals. Preferably, at least one of the identifying aspects of the biological traits is derived from a measurement taken by reflecting light off of the subdermal layers of skin tissue.

37 Claims, 3 Drawing Sheets

U.S. PATENT DOCUMENTS

| | | | |
|---|---|---|---|
| 5,088,817 A | 2/1992 | Igaki et al. | 356/71 |
| 5,103,486 A | 4/1992 | Grippi | 382/4 |
| 5,172,698 A | 12/1992 | Stanko | |
| 5,180,901 A | 1/1993 | Hiramatsu | |
| 5,230,025 A | 7/1993 | Fishbine et al. | 382/4 |
| 5,335,288 A | 8/1994 | Faulkner | 382/4 |
| 5,456,256 A | 10/1995 | Schneider et al. | |
| 5,526,808 A | 6/1996 | Kaminsky | |
| 5,586,171 A | 12/1996 | McAllister et al. | |
| 5,623,552 A | 4/1997 | Lane | 382/124 |
| 5,666,400 A | 9/1997 | McAllister et al. | 379/67 |
| 5,704,352 A | 1/1998 | Tremblay et al. | |
| 5,719,950 A | 2/1998 | Osten et al. | 382/115 |
| 5,737,439 A | 4/1998 | Lapsley et al. | 382/115 |
| 5,774,571 A | 6/1998 | Marshall | 382/119 |
| 5,789,733 A | 8/1998 | Jachimowicz et al. | |
| 5,872,834 A | 2/1999 | Teitelbaum | |
| 5,892,838 A * | 4/1999 | Brady | 382/115 |
| 5,935,062 A | 8/1999 | Messerschmidt et al. | |
| 5,982,914 A | 11/1999 | Lee et al. | |
| 5,987,232 A | 11/1999 | Tabuki | 395/187.01 |
| 6,088,585 A | 7/2000 | Schmitt et al. | |
| 6,104,913 A | 8/2000 | McAllister | 455/41 |
| 6,104,922 A | 8/2000 | Baumann | 455/410 |
| 6,148,094 A | 11/2000 | Kinsella | 382/124 |
| 6,164,403 A | 12/2000 | Wuidart | 180/287 |
| 6,171,112 B1 | 1/2001 | Clark et al. | 434/322 |
| 6,182,892 B1 | 2/2001 | Angelo et al. | 235/380 |
| 6,193,153 B1 | 2/2001 | Lambert | 235/380 |
| 6,202,151 B1 | 3/2001 | Musgrave et al. | 713/186 |
| 6,208,264 B1 | 3/2001 | Bradney et al. | 340/825.31 |
| 6,219,639 B1 | 4/2001 | Bakis et al. | |
| 6,225,890 B1 | 5/2001 | Murphy | 340/426 |
| 6,232,874 B1 | 5/2001 | Murphy | 340/426 |
| 6,266,566 B1 | 7/2001 | Nichols et al. | |
| 6,269,348 B1 | 7/2001 | Pare, Jr. et al. | 705/39 |
| 6,275,806 B1 | 8/2001 | Pertrushin | 704/272 |
| 6,277,079 B1 * | 8/2001 | Avicola et al. | 600/502 |
| 6,289,453 B1 | 9/2001 | Walker et al. | 713/175 |
| 6,483,929 B1 | 11/2002 | Murakami et al. | |
| 6,496,595 B1 | 12/2002 | Puchek et al. | |
| 6,628,809 B1 | 9/2003 | Rowe et al. | |
| 6,681,029 B1 | 1/2004 | Rhoads | |
| 6,816,605 B2 | 11/2004 | Rowe et al. | |
| 6,898,299 B1 | 5/2005 | Brooks | |
| 6,920,231 B1 | 7/2005 | Griffin | |
| 7,113,616 B2 | 9/2006 | Ito et al. | |
| 7,133,792 B2 | 11/2006 | Murakami et al. | |
| 7,188,362 B2 | 3/2007 | Brandys | |
| 7,214,953 B2 | 5/2007 | Setlak et al. | |
| 7,358,514 B2 | 4/2008 | Setlak et al. | |
| 7,378,939 B2 * | 5/2008 | Sengupta et al. | 340/5.64 |
| 7,467,400 B1 * | 12/2008 | Moss et al. | 726/3 |
| 2001/0033220 A1 | 10/2001 | Stone et al. | |
| 2006/0093190 A1 | 5/2006 | Cheng et al. | |
| 2007/0192591 A1* | 8/2007 | Yumoto et al. | 713/159 |
| 2007/0287892 A1* | 12/2007 | Estrella | 600/300 |
| 2008/0097998 A1* | 4/2008 | Herbach | 707/9 |
| 2008/0223926 A1* | 9/2008 | Miller et al. | 235/382 |
| 2008/0242231 A1* | 10/2008 | Gray | 455/66.1 |
| 2008/0260211 A1* | 10/2008 | Bennett et al. | 382/115 |

FOREIGN PATENT DOCUMENTS

| | | | |
|---|---|---|---|
| EP | 1 916 615 A1 | 4/2008 | |
| JP | SHO 60-126787 | 7/1985 | |
| JP | SHO 61-175865 | 8/1986 | |
| JP | SHO 63-20583 | 1/1988 | |
| JP | SHO 63-53099 | 3/1988 | |
| JP | SHO 63-120385 | 5/1988 | |
| JP | SHO 63-313288 | 12/1988 | |
| JP | HEI 1-175362 | 12/1989 | |
| JP | HEI 4-24889 | 1/1992 | |
| JP | 2000-181871 | 6/2000 | |
| JP | 2000181871 | * 6/2000 | |
| WO | WO 88/04153 | 6/1988 | |
| WO | WO 98/37519 | 8/1998 | |
| WO | WO 2006059190 A2 | * 6/2006 | |

OTHER PUBLICATIONS

"Veritouch Integrates Authentec's Trueprint Based Sensor", Sep. 25, 2001, AuthenTec Inc.*

"What is a Bone Density Test?", 2001, Merck & Co., Inc.*

"Filling Security Gaps with Biometrics", Woo Siew Chin, New Strait Times, Kuala Lampur, Oct. 17, 2001.*

Nataliya Sukhai, Access Control & Biometrics, 2004, ACM, pp. 124-127.*

Sharmilee et al, Secure WBAN using rule-based IDS with biometrics and MAC authentication, 2008, IEEE, pp. 102-107.*

Bao et al, Physiological Signal Based Entity Authentication for Body Area Sensor Networks and Mobile Healthcare Systems, 2005, IEEE, pp. 2455-2458.*

Biel, Lena et al., "ECG Analysis: A New Approach in Human Identification," IMTC/99. Proc. of the 16th IEEE Instrumentation and Measurement Technology Conf., vol. 1, 1999, pp. 557-561.

Office Action for U.S. Appl. No. 09/815,885, filed Mar. 23, 2001, mailed from the USPTO on Mar. 17, 2008, 12 pgs.

Office Action for U.S. Appl. No. 10/300,659, filed Nov. 19, 2002, mailed from the USPTO on Dec. 27, 2007, 15 pgs.

Office Action for U.S. Appl. No. 09/758,836, filed Jan. 10, 2001, mailed from the USPTO on Apr. 17, 2007, 12 pgs.

Office Action for U.S. Appl. No. 09/758,836, filed Jan. 10, 2001, mailed from the USPTO on Jul. 23, 2008, 16 pgs.

Kachigan, Sam Kash, "Multivariate Statistical Analysis," Radius Press, 1991, 1986, 1982, 4 pgs.

Hayes, Matthew J., et al., "Quantitative Evaluation of Photoplethysmographic Artefact Reduction for Pulse Oximetry," Optical Engineering Group, Department of Electrical and Electronic Engineering, Loughborough University, Loughborough, Leicestershire, LE11, 3TU, UK, SPIE vol. 3570, Sep. 1, 1998, 14 pgs.

Scholz, Udo, "Multivariate Spectral Analysis of the Beat-to-Beat Sampled Cortical NIRS-Signals and the Heart Rate Variability," Department of Neurology, Charite, Humboldt University, Berlin, Germany, SPIE vol. 3566, Sep. 1998, 6 pgs.

Hoeksel, S.A., et al., "Detection of Dicrotic Notch in Arterial Pressure Signals," Department of Anesthesiology, Cardiovascular Research Institute Maastricht, Maastricht University, The Netherlands, www.medscape.com, 1997, 1 pg.

Cysewska-Sobusiak, Anna, "Noninvasive Monitoring of Arterial Blood Oxygenation with Spectrophotometric Technique," Institute of Electronics and Communications, Technical University of Poznan, Piotrowo 3a, PL-60-965 Poznan, Poland, SPIE vol. 1711, 1992, 14 pgs.

"Artificial Pacemaker," Wikipedia, the free encyclopedia, 3 pgs.

"Type: Rate-Responsive Pacing Systems," Medtronic, 1 pg.

Leichter, I., et al., "Effect of Age and Sex on Bone Density, Bone Mineral Content and Cortical Index," Energy Citations Database (ECD)—Energy and Energy-Related Bibliographic Citations, May 1, 1981, 2 pgs.

Miller, Paul D., M.D., "Increased Age Is a Risk Factor," "Assessing Fracture Risk: Which Factors Are Clinically Most Important?" 4 pgs.

Smith, SL, "Attribution of Hand Bones to Sex and Population Groups," Journal of Forensic Sciences, vol. 41, Issue 3, www.astm.org/cgi-bin/SoftCart.exe/JOURNALS/FORENSIC/PAGES/JFS41396046, May 1996, printed Jan. 14, 2007, 1 pg.

Office Action for U.S. Appl. No. 09/758,836, filed Jan. 10, 2001, mailed from USPTO Feb. 4, 2009, 15 pgs.

Jain, Anil K., et al., "Multibiometric Systems," Communications of the ACM, Jan. 2004, vol. 47, No. 1, pp. 34-40.

International Search Report for PCT/US09/31638, filed Jan. 22, 2009, mailed Mar. 6, 2009, 12 pgs.

* cited by examiner

METHOD FOR BIOMETRIC AUTHENTICATION THROUGH LAYERING BIOMETRIC TRAITS

RELATED APPLICATION

This application claims priority to the U.S. Provisional Application Ser. No. 60/210,270, flied Jun. 8, 2000, titled "METHOD AND APPARATUS FOR HISTOLOGICAL AND PHYSIOLOGICAL BIOMETRIC OPERATION AND AUTHENTICATION."

BACKGROUND

1. Field of the Invention

The present invention relates to a method for electronically authenticating the identity of an individual using the individual's physiological traits. More specifically, the present invention relates to methods for layering a plurality of biometric markers to provide a composite biometric marker for use in authenticating a person's identity.

2. Background Art

Biometric markers are becoming increasingly more important in today's electronic society. A biometric marker is a biological trait or combination of traits in an individual that is used to authenticate that individual's identity, thereby authorizing a transaction, activating a device, or otherwise instigating some action. In effect, biometric markers are physiological keys or passwords used to authenticate a person's identity to authorize some specific action. Known biometric markers include fingerprints, hand and face geometry, and retinal and iris patterns. Biometric markers also encompass unique behavioral responses such as the recognition of vocal patterns and the analysis of hand movements.

Biometric authentication involves two basic steps: registration and verification. Registration concerns the initial enrollment of a person or individual with the authenticating entity. The individual's biometric information is captured and stored in the form of a biometric template or profile that serves as that individual's identifier. The step of verification involves the subsequent measuring of that individual's biometric information with the stored biometric profile. Authentication of that individual's identity takes place if the newly measured biometric information matches with that in the stored profile.

Various devices exist that capture and electronically process biometric markers for registration and verification. Devices that capture superficial anatomical traits (e.g., finger or hand prints, facial geometry, retinal patterns, etc.) often require unwieldy and/or expensive scanners and optical devices that reflect light off of skin or other surfaces and then capture the reflected light in the form of an electronic signal. These devices then compare one or more features from the signal with a previously stored signal used as an identifier for a particular person. Various features of the signal may be used for the comparison, including a visual representation of a physiological surface produced by the signal; the wave length characteristics of the signal; or the signal characteristics when transformed into a function of the movement of a finger across an optical scanning surface.

In the case of a fingerprint, some devices scan the surface ridges of a fingerprint to form an image representative of the skin print for comparison with a stored image. In the case of a retinal scan, some devices scan a person's retina to form an electronic version of the retina's unique blood vessel pattern. Some devices scan a person's iris to capture its unique contrasting patterns. Hand and face identification systems use scanners to detect the relative anatomical structure and geometry of a person's face or hand.

Other types of devices capture an individual's behavioral traits such as a signature or voice pattern. Voice recognition systems generally use a telephone or microphone to record a standard phrase repeated by the person to be authenticated; the measured voice pattern is compared to a voice pattern stored in the system. Signature authentication typically involves not only the recording of a pattern of contact between a writing utensil and the recording device, but also the measurement of and comparison between the speed of the writing and the pressure applied while writing.

Known biometric authentication systems have several disadvantages. As was previously mentioned, fingerprint or facial geometry recognition systems may require expensive or large scanning devices. Retinal scanning systems often require a person to place his or her eye close to or upon a scanning device, exposing that person to potential infection. Voice recognition devices have problems screening out background noise. Signature recognition devices are subject to the inherent variations in an individual's signature.

Another disadvantage of the existing art is that it typically is able to use only those biometric markers that are deemed unique to each individual. These markers thus may have only minute differences and must distinguish subtle differences between individual markers. Measuring and authenticating such patterns in turn requires a high degree of electronic sophistication. If the biometric marker is used to identify an individual from among a large group of individuals, computer memory storage and processing capability may also have to be sophisticated and thus expensive.

An additional disadvantage of prior art is that with relatively few truly unique biometric markers, the likelihood of decreased privacy increases with the widespread use of those markers. In other words, the widespread use of just one or two types of markers increases the likelihood that an unauthorized person could, by chance or otherwise, be improperly granted access. If an unauthorized person were improperly given access, that individual may have access to numerous secured devices or accounts. This is the same problem that exists when a person chooses the same password for all his accounts or electronic devices and the password is stolen.

SUMMARY AND OBJECTS OF THE INVENTION

The present invention provides a biometric authentication system that uses a single technology to measure multiple, varied biological traits to provide authentication based on a combination of biological traits. Preferably, at least one of these biometric markers is an internal, live physiological trait such as a heartbeat waveform. At least one of these biometric traits is a live physiological trait, such as a heartbeat waveform, that is substantially-but not necessarily completely-unique to the population of individuals. Preferably, at least one of the identifying aspects of the biological traits is derived from a measurement taken by reflecting light off of the subdermal layers of skin tissue.

In the preferred embodiments of the present invention, at least one of the biological traits is converted into a digital signal that is normalized to enhance the trait's capacity to function as a biometric marker or identifier. Also, in the preferred embodiments, the biometric authentication system is designed to operate on a portable device such as a PDA or cell phone.

Accordingly, it is an object of some embodiments of the present invention to provide a biometric authentication system using a layered live biometric marker.

It is another object of some embodiments of the present invention to provide a biometric authentication system that greatly increases the possible number of viable biometric identifiers.

It is a further object of some embodiments of the present invention to provide a biometric authentication system that does not require the use of a biometric marker that is completely unique to each individual.

It is a further object of some embodiments of the present invention to provide a layered biometric authentication system that uses a single technology to measure multiple, varied biological traits and is relatively inexpensive and portable.

It is yet another object of some embodiments of the present invention to provide a layered biometric authentication system that does not exclusively rely on the measurement of superficial anatomical structure.

BRIEF DESCRIPTION OF THE DRAWINGS

The foregoing and other objects and features of the present invention will become more fully apparent from the accompanying drawings when considered in conjunction with the following description and appended claims. Although the drawings depict only typical embodiments of the invention and are thus not to be deemed limiting of the invention's scope, the accompanying drawings help explain the invention in added detail.

DETAILED DESCRIPTION OF THE PREFERRED EMBODIMENTS

Figure 1:
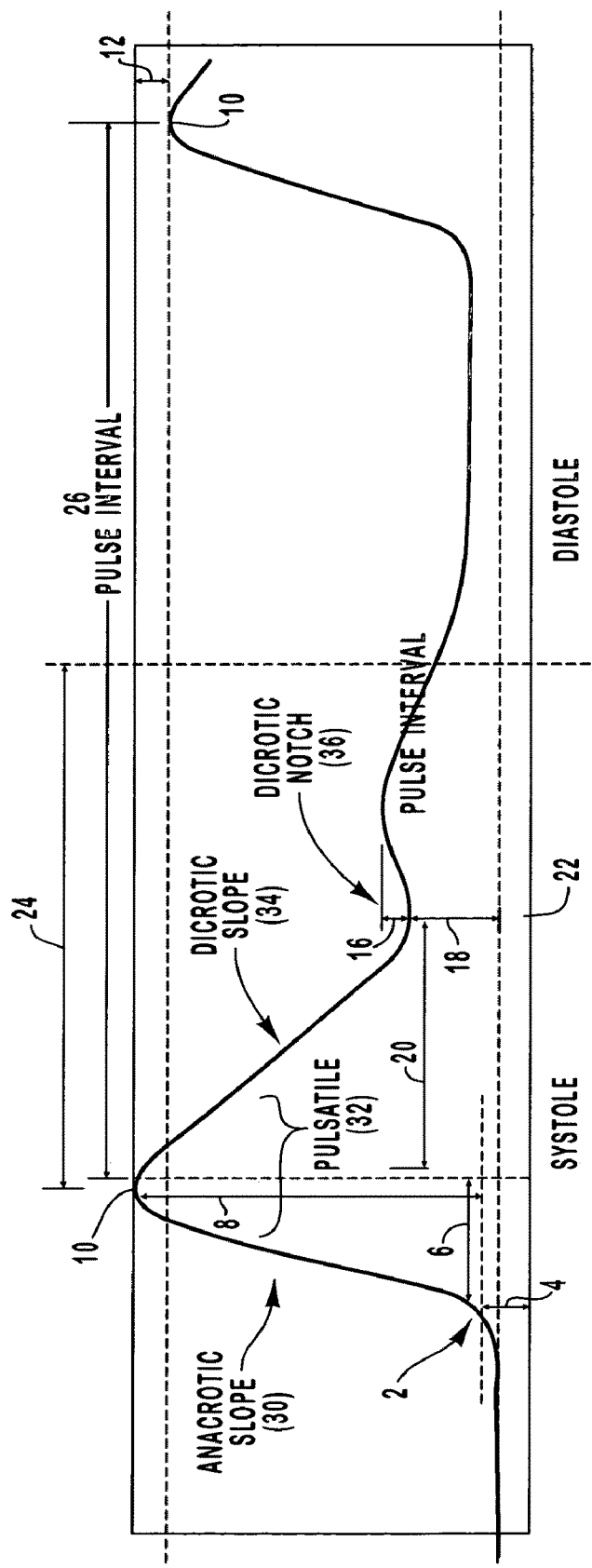
FIG. 1 illustrates a heartbeat waveform that can serve as one of the biological traits used in the biometric authentication system of the present invention.

The figures listed above are expressly incorporated as part of this detailed description.

It is emphasized that the present invention, as illustrated in the figures and description herein, can be embodied or performed in a wide variety of ways. Thus, neither the drawings nor the following more detailed description of the various embodiments of the system and method of the present invention limit the scope of the invention. The drawings and detailed description are merely representative of the particular embodiments of the invention; the substantive scope of the present invention is limited only by the appended claims.

The various embodiments of the invention will be best understood by reference to the drawings, wherein like elements are designated by like alphanumeric characters throughout. Moreover, it should be noted that because the present invention is computer-implemented, particular embodiments may range from computer executable instructions as part of computer readable media to hardware used to implement the processes herein described. Embodiments of the present invention also include combinations of hardware and computer executable instructions.

Further, whether the invention is described in terms of a method, a system, an application, a type of software, or as computer readable media having computer executable instructions stored thereon, the description is intended to include "instructions" such as program modules, routines, programs, objects, components, data structures, etc. that perform particular tasks within a computing environment. Executable instructions may comprise instructions and data which cause a general purpose computer, special purpose computer, or special purpose processing device to perform a certain function or group of functions.

In addition, computer readable media may comprise any available media which can be accessed by a general purpose or special purpose computer. By way of example and not limitation, such computer readable media includes any type of RAM (SDRAM, ESDRAM, etc.) or ROM (EPROM, EEPROM, FEPROM, EAROM, etc.) stored on any physical medium, including a computer chip, a server, or a disk. Disks can include optical storage devices (e.g., CD-ROMs or DVD-ROMs), magnetic storage devices (e.g., floppy disks, Zip® disks, or Bernoulli® cartridges), or any other medium that can be used to store the desired executable instructions or data fields and which can be accessed by a general purpose or special purpose computer. Combinations of any of the above-named media are also included within the scope of computer readable media.

The present invention provides a biometric authentication system that uses a single technology to measure multiple, varied biological or histological traits. At least one of the biological traits is a trait that is substantially unique—but not necessarily inherently totally unique (e.g., as in the way that a fingerprint is inherently completely unique to each individual)—to the population of individuals. Although the latter biological trait, herein sometimes referred to as a "first" biological trait, need not be an inherently unique identifier, the latter biological trait is preferably chosen so as to be one that generally remains relatively consistent over time.

In the preferred embodiments of the present invention, a first biological trait is a live physiological trait such as a heartbeat such as that shown in FIG. 1. Preferably, the heartbeat is measured so that various features of the waveform can be used to identify the individual whose waveform is being analyzed. For example, the position on the upslope 2 of the heartbeat waveform having the fastest rate of change slope can be recorded and various attributes of that position can be noted. The amplitude of that position 4, its position from the center of the pulse 6 and amplitude of the actual beat relative to the position 8 can all be measured and recorded. Thus, multiple quantitative features can be extracted from a single characteristic of a waveform.

The heartbeat waveform can also be analyzed relative to the major peaks such as the two peaks 10 shown in FIG. 1. Various parameters associated with waveform peaks include, but are not limited to, the differences between the two peak amplitudes 12, the differences between the two peak rates of changes, the relative position of the dicrotic notch 14, how deep the notch is 16, how far the dicrotic notch is from a zero point or from a reference point 18, and how far the dicrotic notch is from the center of one of the peaks 20, where the peak of the dicrotic notch is located along the horizontal 22, and the position of the various peaks from the center of the waveform 24 and from the center of the other peak 26.

Figure 2:
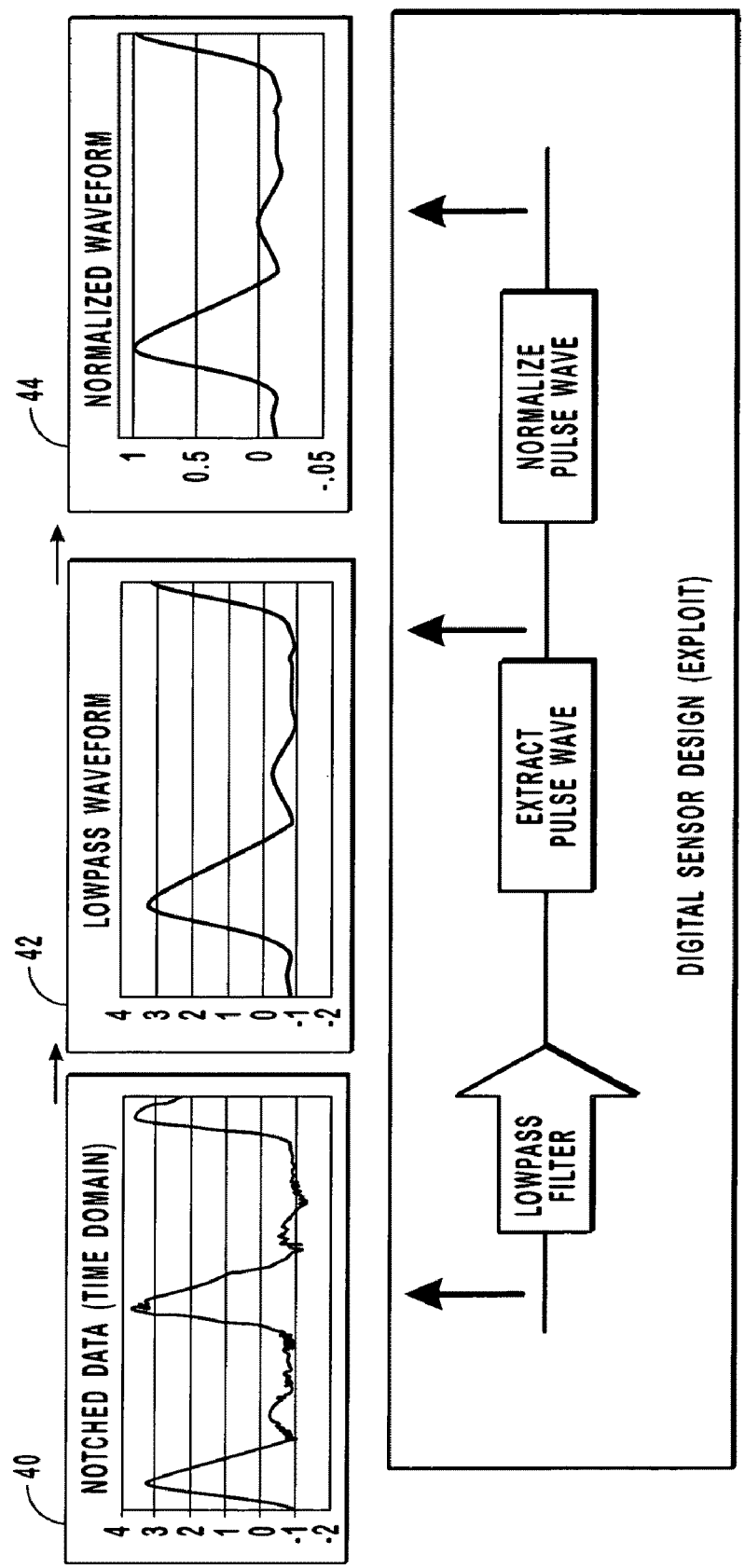
FIG. 2 illustrates an example of how a heartbeat waveform may be digitally signal processed for use in some embodiments of the present invention.

In the preferred embodiments of the present invention, at least one of the biological traits is converted into a digital signal that is signal processed to enhance the trait's capacity to function as a biometric marker or identifier. For example, in the case of a heartbeat waveform, the captured waveform 40 may be filtered 42 and normalized 44 as shown in FIG. 2. In some embodiments of the present invention, some of the quantitative features are globally weighted more than others during normalization and authentication. For example, a particular feature, such as the slope of the dicrotic notch 34, may be considered more or less reliable as an identifier and thereby may be given more or less "statistical" weight. Likewise, the correlation between two measurements for a particular feature or the correlation between two different features may be stronger than for other features and be weighted accordingly.

The present invention also employs at least a second biological trait that is used in conjunction with the first biological trait (note: the terms "first" and "second" do not necessarily refer to a chronological order) to provide the biometric authentication of the present invention. This second trait is preferably also a live physiological trait—i.e., a trait measurable only on a living individual (e.g., a fingerprint is not a live trait since it can be measured from a dead individual or tissue)—that is substantially unique to that individual.

Examples of live, potentially substantially unique biological traits include the depth of the various layers of epithelial tissue from a given point on an individual's skin surface. The density of a particular kind of connective tissue, such as bone density, may be another substantially unique histological trait. Likewise, the light absorption characteristics of skin tissue or the visual retinal patterns of an iris could be substantially unique histological traits.

It should be noted that biometric or physiological traits could relate to various physiological systems including the following: the integumentary system, the skeletal system, the muscular system, the pulmonary system, the respiratory system, the circulatory system, the sensory system, the nervous system, the digestive system, the urinary system, the endocrine system, and/or the reproductive system. The physiological traits can be those physiological activities that are both volitional and non-volitional.

Further, the biological traits may be measured and analyzed in a variety of ways. For example, the traits may be measured in terms of special measurements such as length, area, and volume. The frequency may be used from a waveform representative of a biological trait. The relative motion of particles and fluids can be measured in terms of velocity, acceleration, volumetric flow rate or angular velocity, and angular acceleration. Physical interaction such as force, surface tension, pressure, viscosity, work, and torque are other possible measurements.

The physiological and histological traits may also be based upon energy or heat related characteristics such as power, heat quantity, heat flux, volumetric heat release, heat transfer coefficient, heat capacity, and thermal conductivity. Likewise, measurements, such as electric quantity, electromotive force, electric field strength, electric resistance, and electrical capacities, could serve as measurements of biometric traits, depending upon the tissue or physiological process being monitored. Characteristics related to magnetism, such as magnetic flux, induce, magnetic permeability, magnetic flux density, magnetic field strength, and magneto-motive force may be used. Other potential measurements may include luminous flux, luminance, illumination, radio nucleotide activity, radioactivity, temperature, and absorbed dose and dose equivalent, and an amount of substance (mole).

Figure 3:
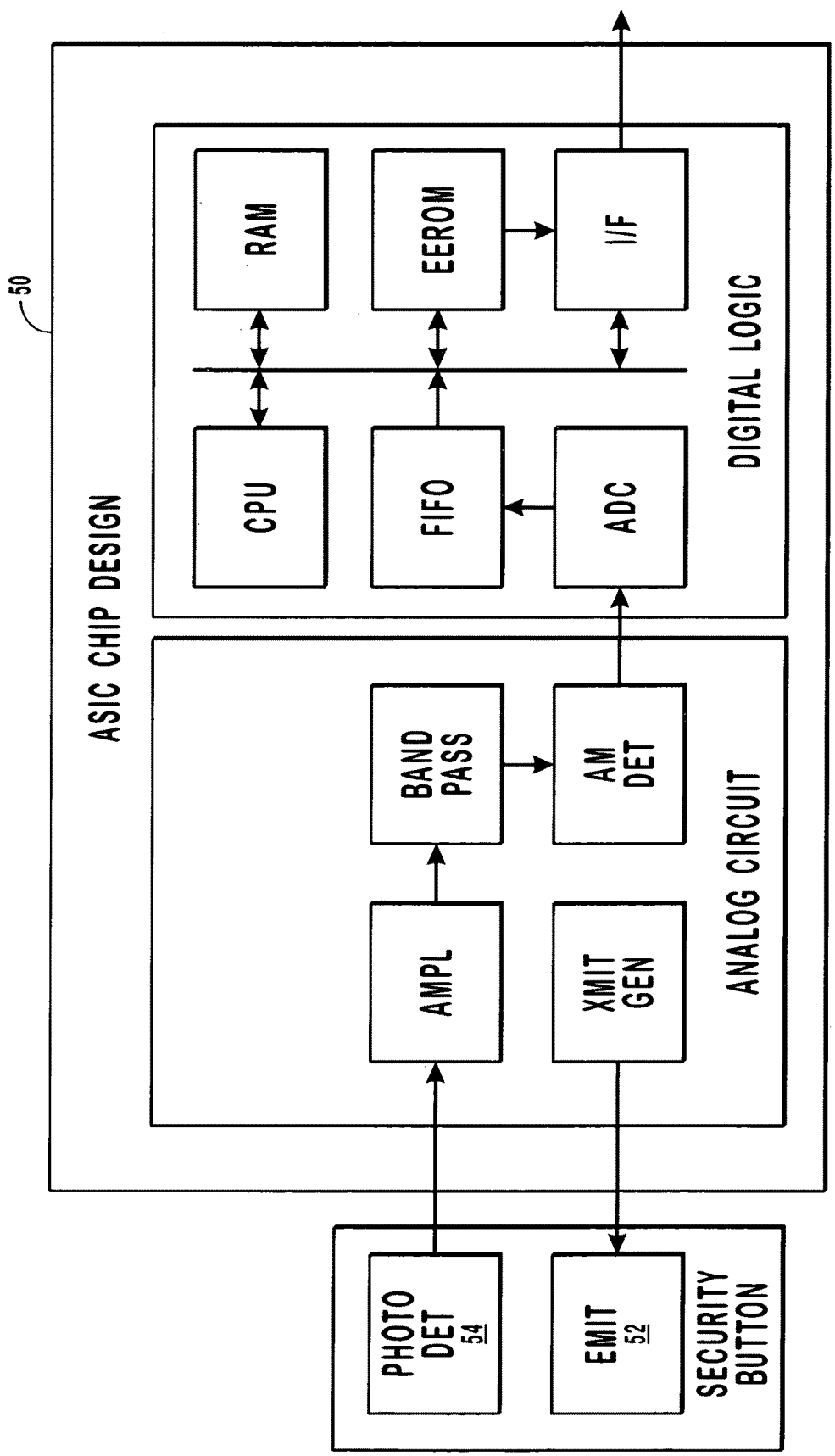
FIG. 3 shows a diagram of one possible device that may be used in the present invention.

In the preferred embodiments of the present invention, the biometric authentication system is designed to operate on a portable computerized device such as a PDA or cell phone. FIG. 3 shows an embodiment of the present invention wherein a portable device includes a single computer chip 50 operably connected to a light emitter 52 and detector 54. In this embodiment, an infrared light (IR) transmitter 52 transmits an JR signal into a person's finger when the finger is placed on the transmitter 52 (whether for purposes of enrollment or verification). The signal transmitter 52 is activated and a signal is emitted from the signal transmitter 52 and is transmitted into the dermal and subdermal tissues of the person's finger. The signal is partly absorbed and reflected by the dermal and subdermal tissues. The reflected signal is received by a signal receiver 54 and transmitted through receiving wires to a chip 50 where the received signal is processed.

In some embodiments, during the enrollment process, it is preferable if the heartbeat signal captured is the first full heartbeat that occurs after the user has placed his finger on a device. The process preferably takes one second or less. In one embodiment, the biometric measuring hardware is primarily an analog circuitry and takes about one-half second before it is ready to begin sampling a user's heartbeat. Because of hardware limitations in some embodiments, heartbeat signal capture within two or more heartbeats is preferable.

Another biological trait is captured in conjunction (whether simultaneously or subsequently) with the first biological trait. For example, in the case of the first trait being a heartbeat waveform measurement taken by using an IR signal that is reflected off of skin tissue, a convenient second biological trait might be the measurement of the skin's conductance of light. In the preferred embodiments, at least one of the identifying aspects of the biological traits is derived from a measurement taken by reflecting light off of the subdermal layers of skin tissue.

After at least two biological traits are measured, the present invention compares each of the traits to corresponding traits previously enrolled for that individual. If both of those traits match their respective enrolled traits, then the individual in question is authenticated.

In some embodiments of the present invention, an individual is authenticated when the individual selects a user name or identification that is associated with a particular biological trait such as a normalized waveform. In other words, the biometric traits may be used in conjunction with non-biometric security features such as passwords, social security numbers, ID cards, etc. For example, the individual or user might activate a portable device of the present invention. The device then could prompt the user to select from among several registered users, or ask the user to identify himself or herself. The user may then enter or select some form of identification recognizable to the device, such as a name, social security number or password, and the device would recall from machine memory a previously enrolled normalized waveform associated with the identifying entry/selection. The machine might then measure the user's waveform and compare it with the enrolled waveform recalled from memory. The user is authenticated if the waveforms correspond appropriately.

In some embodiments of the present invention, the authenticating device is designed to provide access to a set number of authorized users. The authorized users would each enroll their individual biometric traits to be stored in a database either inside the portable device or in a remote database that the portable device can access. When a user desires to be authenticated by the portable device, the device scans the trait database and compares the user's presently read trait with the enrolled traits to find a match. If there is a match, the user is granted access.

Some systems of the present invention include means for verifying physiological activity. These means for verifying physiological activity are primarily to prevent an unauthorized person from using dead tissues as a way to circumvent the authentication process. For example, one device involves a personal biometric authentication system wherein inherently specific biometric parameters are measured and recognized and at least one non-specific biometric parameter is recognized and compared with physiological norms. Likewise, one device involves an anti-fraud biometric scanner that determines whether blood flow is taking place in the object being scanned and whether such blood flow is consistent with that of a living human. In addition, some embodiments of the present invention can keep track of a history showing who has accessed the authentication device.

The methods of the present invention are carried out at least in part by machine-readable instructions implemented within a computer-based system. The machine-readable instructions may be located upon any appropriate medium. For example, the instructions may be integrated into a chip or may be stored as data on a portable storage medium such as a floppy disk or CD ROM. The methods of the present invention may likewise be carried out using a signal transmitted over a wired or wireless network wherein the signal carries the machine-readable instructions.

The present invention may be embodied in other specific forms without departing from its spirit or essential characteristics. The described embodiments herein should be deemed only as illustrative. Indeed, the appended claims indicate the scope of the invention; the description, being used for illustrative purposes, does not limit the scope of the invention. All variations that come within the meaning and range of equivalency of the claims are to be embraced within their scope.

What is claimed is:

1. A computer-implemented method for biometric authentication, said method comprising:
   reading a first unique, heartbeat waveform of an individual;
   analyzing said waveform to identify unique traits;
   reading a second unique, internal physiological trait of said individual; and
   authenticating the identity of said individual if both said waveform and said physiological trait correspond with previously enrolled traits recorded for said individual.

2. The method of claim 1 wherein said first unique, heartbeat waveform is measured by reflecting light off of the subdermal layers of skin tissue on said individual.

3. The method of claim 1 wherein said step of authenticating is performed by a portable computerized device.

4. The method of claim 3 further comprising weighting some quantitative features of said biological traits more than other quantitative features of said biological traits.

5. The method of claim 4 further comprising means for verifying physiological activity.

6. The method of claim 1 wherein said second unique, internal physiological trait comprises the light absorption characteristics of the skin tissue of said individual.

7. The computer-implemented method of claim 1, wherein analyzing said heartbeat waveform includes filtering and normalizing the heartbeat waveform.

8. The computer-implemented method of claim 1, wherein analyzing said heartbeat waveform includes analyzing a dicrotic notch.

9. The computer-implemented method of claim 1, wherein analyzing said heartbeat waveform includes analyzing two peak amplitudes.

10. A computer-implemented method performed by a computer device, the method comprising:
    reading a first live internal biological identifier of an individual, said first live internal biological identifier being a heartbeat waveform measured by reflecting light off of the subdermal layers of skin tissue on said individual;
    reading a second live internal biological identifier of said individual; and
    authenticating the identity of said individual if both of said biological identifiers correspond with previously enrolled biological identifiers taken for said individual.

11. The method of claim 10 wherein said second live internal biological identifier comprises the depth of a previously-identified layer of epithelial tissue.

12. The method of claim 10 wherein said second live internal biological identifier comprises the retinal pattern of an iris.

13. The method of claim 10 further comprising weighting some quantitative features of said biological identifiers more than other quantitative features of said biological identifiers.

14. A computer implemented method performed by a computer device, the method comprising:
    reading a first live internal biological identifier of an individual, said first live internal biological identifier being a heartbeat waveform measured by reflecting light off of the subdermal layers of skin tissue on said individual;
    analyzing said waveform to identify unique traits;
    reading a second live internal biological identifier of said individual, said second live internal biological identifier comprising bone density; and
    authenticating the identity of said individual if both of said biological identifiers correspond with previously enrolled biological identifiers taken for said individual.

15. The method of claim 14 wherein the computer device is a personal digital assistant.

16. The method of claim 14, wherein analyzing said heartbeat waveform includes filtering and normalizing the heartbeat waveform.

17. The method of claim 14, wherein analyzing said heartbeat waveform includes analyzing a dicrotic notch.

18. The method of claim 14, wherein analyzing said heartbeat waveform includes analyzing two peak amplitudes.

19. A computer-implemented method performed by a computer authenticating device comprising:
    presenting an individual's live body tissue to the computer authenticating device for the capturing of a first unique, heartbeat waveform of said individual;
    analyzing said waveform to identity unique features;
    providing a second unique, internal physiological identifier of said individual to said authentication device;
    authenticating said second physiological identifier by comparing the unique features with those recorded for that individual; and
    upon authentication by said device, operating said device to perform functions previously inaccessible to unauthorized individuals, said authentication taking place upon the matching of both of said biological identifiers with previously enrolled physiological identifiers taken for said individual.

20. The method of claim 19 wherein said second unique, internal physiological identifier comprises the light absorption characteristics of the skin tissue of said individual.

21. The method of claim 19 wherein said authentication further comprises weighting some quantitative features of said biological identifiers more than other quantitative features of said biological identifiers.

22. The method of claim 19, wherein analyzing said heartbeat waveform includes filtering and normalizing the heartbeat waveform.

23. The method of claim 19, wherein analyzing said heartbeat waveform includes analyzing a dicrotic notch.

24. The method of claim 19, wherein analyzing said heartbeat waveform includes analyzing two peak amplitudes.

25. A computer-readable storage medium comprising instructions to cause a computing device to perform a method, comprising:
- reading a unique heartbeat waveform of an individual;
- analyzing said waveform to identify unique traits;
- reading a second unique, internal physiological identifier of said individual; and
- authenticating the identity of said individual if both said waveform and said physiological identifier correspond with previously enrolled identifiers recorded for said individual.

26. The computer-readable storage medium of claim 25, wherein said second internal physiological identifier comprises the depth of a previously-identified layer of epithelial tissue.

27. The computer-readable storage medium of claim 25, wherein said second internal physiological identifier comprises the retinal pattern of an iris.

28. The computer-readable storage medium of claim 25, wherein said instructions are performed by a single computer chip.

29. The medium of claim 25 wherein said second unique, internal physiological identifier is measured by reflecting light off of the skin of said individual.

30. The medium of claim 25 wherein said second unique, internal physiological identifier comprises the light absorption characteristics of the skin tissue of said individual.

31. The computer-readable medium of claim 25, wherein analyzing said heartbeat waveform includes filtering and normalizing the heartbeat waveform.

32. The computer-readable medium of claim 25, wherein analyzing said heartbeat waveform includes analyzing a dicrotic notch.

33. The computer-readable medium of claim 25, wherein analyzing said heartbeat waveform includes analyzing two peak amplitudes.

34. A layered biometric authentication system comprising:
- a portable computerized device having an infrared emitter and detector operably connected to a single computer chip;
- means for capturing a first unique heartbeat waveform of an individual, said means being located on said portable device and operably connected to said computer chip, said waveform being measured by reflecting light off of the subdermal layers of skin tissue on said individual;
- means for analyzing said waveform to identify unique traits;
- means for capturing a second internal physiological identifier of said individual, said means for reading the second biological identifier being located on said portable device and operably connected to said computer chip;
- means for verifying physiological activity, said verifying means being operably connected to said computer chip; and
- means for authenticating the identity of said individual if both of said waveform and said physiological identifier correspond with previously enrolled identifiers recorded for said individual, said means for authenticating weighting some quantitative features of said identifiers more than other quantitative features of said identifiers.

35. The layered biometric authentication system of claim 34, wherein means for analyzing includes means for filtering and normalizing the heartbeat waveform.

36. The layered biometric authentication system of claim 34, wherein means for analyzing includes means for analyzing a dicrotic notch.

37. The layered biometric authentication system of claim 34, wherein means for analyzing includes means for analyzing two peak amplitudes.

* * * * *